Oct. 30, 1945.　　T. S. DONNELLY, JR　　2,387,888
ELECTRODE HOLDER
Original Filed Feb. 19, 1943　　2 Sheets-Sheet 1
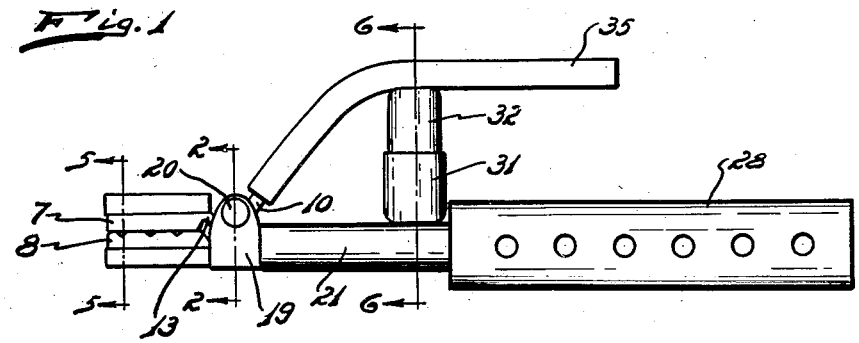
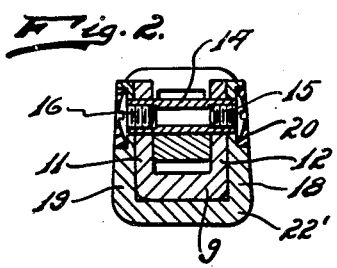
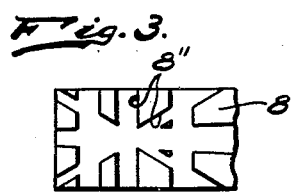
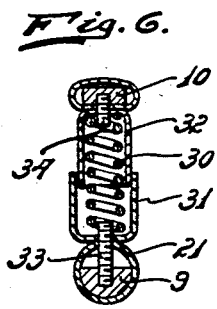
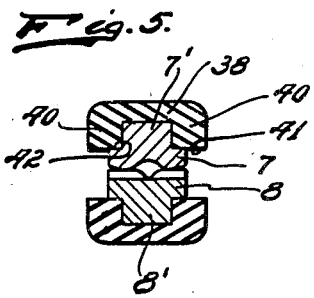
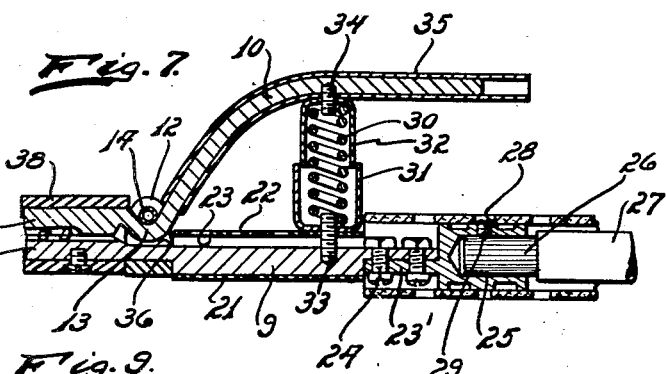
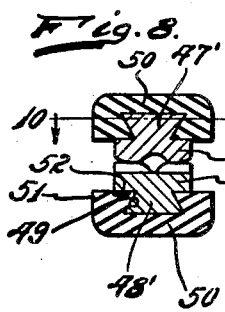
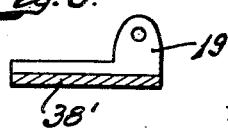
INVENTOR.
THOMAS S. DONNELLY JR.
BY Thos. S. Donnelly
HIS ATTORNEY Oct. 30, 1945. T. S. DONNELLY, JR 2,387,888
ELECTRODE HOLDER
Original Filed Feb. 19, 1943  2 Sheets-Sheet 2
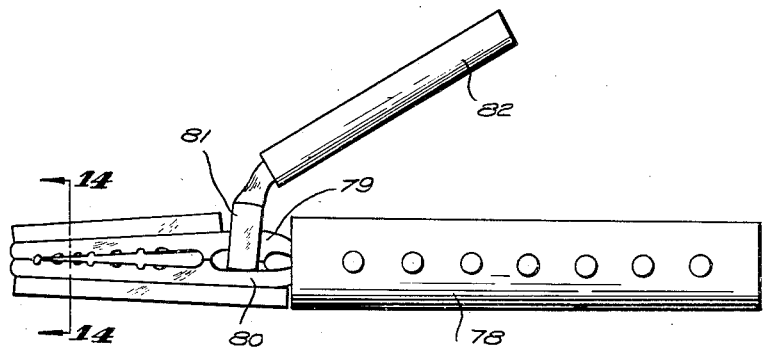
Fig. 13.
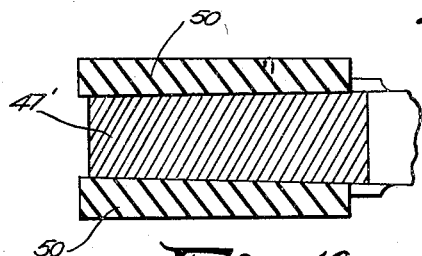
Fig. 10.
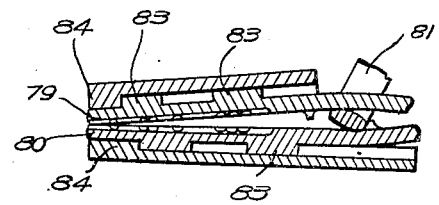
Fig. 15.
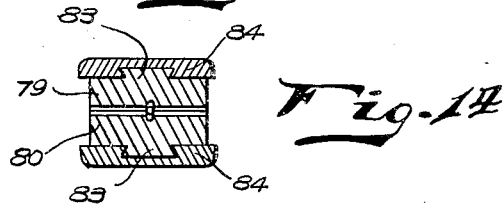
Fig. 14.
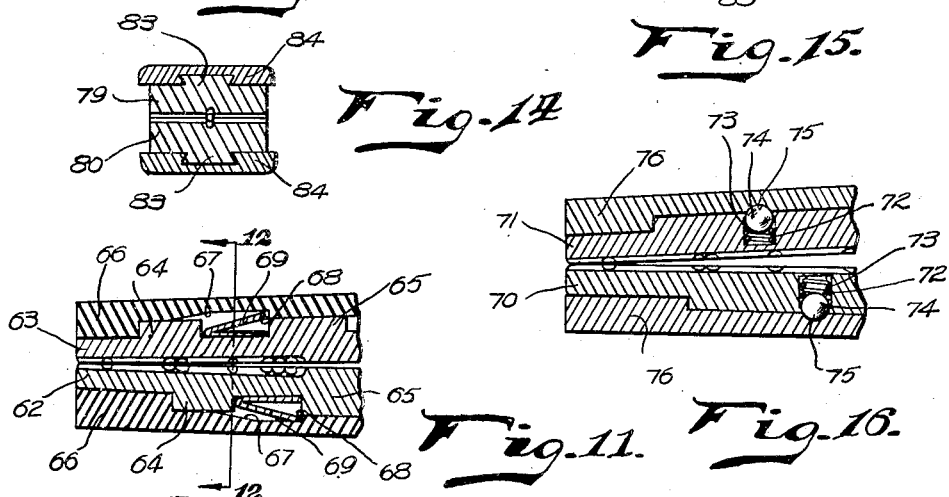
Fig. 11.  Fig. 16.
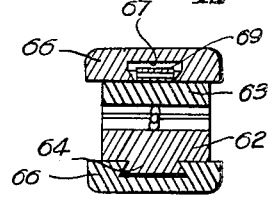
Fig. 12.
INVENTOR.
THOMAS S. DONNELLY JR.
BY 
HIS ATTORNEY.

Patented Oct. 30, 1945

2,387,888

UNITED STATES PATENT OFFICE 2,387,888

ELECTRODE HOLDER

Thomas S. Donnelly, Jr., Detroit, Mich., assignor to Bordon Mfg. Co., Inc., Detroit, Mich., a corporation of Michigan Continuation of application Serial No. 476,479, February 19, 1943. This application March 10, 1945, Serial No. 582,013

5 Claims. (Cl. 219—8)

This application constitutes a continuation of my application Serial No. 476,479, filed February 19, 1943, and which is now pending, this application being substituted for the said previously filed application.

My invention relates to a new and useful improvement in an electrode holder used in arc welding operations. It is an object of the present invention to provide in an electrode holder a pair of gripping jaws having insulating means mounted thereon whereby the insulating means will serve to insulate the jaws from heat and electricity, and whereby the jaws themselves will serve as reinforcement for the insulation.

Another object of the invention is the provision in an electrode holder of a pair of gripping jaws having insulating means mounted thereon which may be easily and quickly removed and replaced.

Another object of the invention is the provision in an electrode holder of a construction whereby one of the jaws carries a pair of lugs on which the other jaw is pivotally mounted, and whereby the lugs themselves are insulated from heat and electricity.

Another object of the invention is the provision in an electrode holder of a structure whereby parts are insulated by tubular members slipped onto the parts insulated and retained in position.

Another object of the invention is the provision in an electrode holder of means for insulating the lower jaw support, whereby ventilation may be easily effected for cooling purposes.

Another object of the invention is the provision of a structure which will serve as a means for retaining a pivot pin in position and at the same time serve as a retainer for insulating plates.

Another object of the invention is the provision of an electrode holder so constructed and arranged that it will be compact, light, durable, well-balanced, and highly efficient in use.

Another object of the invention is the provision in an electrode holder of jaws and insulated medium so constructed and arranged that a maximum insulation is provided, while permitting a maximum conductivity.

Another object of the invention is the provision in an electrode holder of jaws having projections extending outwardly from the outer face thereof which will serve as a means for mounting insulating plates in position.

Other objects will appear hereinafter.

It is recognized that various modifications and changes may be made in the detail of structure illustrated, and it is intended that such variations and modifications shall be embraced within the scope of the claims which form a part hereof.

Forming a part of this specification are drawings in which:

Fig. 1 is a side elevational view of the invention;

Fig. 2 is a sectional view, slightly enlarged, taken on line 2—2 of Fig. 1;

Fig. 3 is an inside fragmentary plan view of the end of the lower jaw;

Fig. 4 is a plan view from the inside of the end of the upper jaw;

Fig. 5 is a sectional view, slightly enlarged, taken on line 5—5 of Fig. 1;

Fig. 6 is a sectional view, taken on line 6—6 of Fig. 1;

Fig. 7 is a longitudinal, central sectional view of the invention;

Fig. 8 is a view similar to Fig. 5 showing a modified form of the invention;

Fig. 9 is a fragmentary, central, vertical sectional view illustrating a slight modification;

Fig. 10 is a fragmentary sectional view taken on line 10—10 of Fig. 8;

Fig. 11 is a fragmentary, longitudinal sectional view of a jaw showing a modified form of construction;

Fig. 12 is a sectional view taken on line 12—12 of Fig. 11;

Fig. 13 is a fragmentary side elevational view of a different type of electrode holder embodying the invention;

Fig. 14 is a transverse sectional view taken on line 14—14 of Fig. 13;

Fig. 15 is a longitudinal central sectional view of the jaws illustrated in Fig. 13;

Fig. 16 is a fragmentary longitudinal section showing a modified form of construction.

In the drawings I have illustrated the invention comprising a pair of gripping jaws 7 and 8, a supporting prong 9 projecting rearwardly from the jaw 8, and a trigger handle 10 projecting rearwardly from the jaw 7.

Extending upwardly from the prong 9 is a pair of spaced lugs 11 and 12, between which the downwardly turned portion 13 of the trigger handle 10 engages. Projecting through the lugs 11 and 12 is a metallic member 14, which may be formed tubular and internally threaded, or which may be bored at its ends and internally threaded for reception of screws 15 and 16 which serve to retain the pivot member 14 in position, and which serve to secure the legs 18 and 19 of a U-shaped strip of insulating material in position so as to cover the outer faces of the lugs 11 and 12. This U-shaped member is made from any desirable heat and electrical insulating material, such as fiber, asbestos composition, or the like. The outer faces of the screws 16 are covered by a layer 20 of suitable insulating plastic material, such as plastic wood, putty, or the like. Slipped over the prong 9 is a tube 21 formed from fiber or other suitable insulating material, and having openings 22 formed in its front face to provide a channel or flue 23 through which the air is permitted to flow for cooling purposes.

It will be noted that the end of the tubular insulating member 21 butts against the bight 22' of the U-shaped member. The rear end of the prong 9 is secured to a metallic tongue 23' by means of the bolts 24. This tongue 23' projects outwardly from the shank or socket-bearing member 25 in which the bared end 26 of the conductor or cable 27 is secured. This may be secured by means of solder, a set screw, or in any other suitable manner. Embracing the butt end of the prong 9 and the shank 25 is a handle 28 formed from fiber or other suitable material. A set screw 29 carried by the shank 25 serves as a means for securing the handle 28 in position. By backing the set screw outwardly, the shank 25 is clamped in fixed relation to the handle 28.

A coil spring 30 is embraced by the telescoping cup-shaped members 31 and 32 which are formed from fiber or other suitable heat and electrical insulating material. Studs 33 and 34 serve as a means for retaining the cup members 31 and 32 in position. A tube 35 of insulating material is slipped over the trigger handle 10 and the stud 34 projectes through this tube 35.

It will be noted that between the upper face of the prong 9 and the opposed face of the portion 13 of the trigger there is a clearance 36. When the trigger handle 10 is pressed downwardly toward the prong 9 against the compression of the spring 30, the portion 13 will move downwardly and bear against the face of the prong 9, and when in clamping position, the pivot pin 14 and the portion 13 will be in the position shown in Fig. 7. In this way I have provided a floating mounting. This effects a more rigid clamping of an electrode between the jaws 7 and 8 as it permits the jaws to move toward parallel relation within certain limits.

Extending outwardly from the outer faces of the jaws are projections which serve as mountings for insulation plates to protect the jaws against contact with live bodies. These projections may be longitudinally directed ribs 7' and 8' respectively, as shown in Fig. 5, or they may be separated bosses, as shown in Fig. 11 and Fig. 15.

In the form shown in Fig. 5, these ribs 7' and 8' are shown integral with the jaws 7 and 8. It is believed obvious that they may be formed as separate pieces and secured to the jaws 7 and 8 by screws or the like. The opposed face of the jaw 8 is provided with grooves 8'' as shown in Fig. 3, and the opposed face of the jaw 7 is provided with the grooves 7'' as shown in Fig. 4. It is generally the custom to place the electrode in engagement with one of these grooves before the jaw 7 to move into clamping relation therewith.

I provide insulation for the jaws 7 and 8 but this insulation is not mounted on the jaws. As clearly shown in Fig. 5, the insulation embodies a plate 38 having a central groove 39 formed in one of its faces. This groove is of such size as to snugly receive the rib 7' or 8', and the plate 38 is of such a width as to extend beyond opposite side faces of the jaws 7 and 8.

It will also be noted that the side portions 40 of this plate 38 bear at its face 41 against the outer face 42 of the jaws 7 or 8, as the case may be. Experience has shown that with insulation mounted in this manner, a more durable type of construction is afforded than if a channel member were to be used with its legs overhanging the faces of the jaws. In order to fracture the portions 40, it is necessary either that the plate 38 be moved outwardly from the rib 7' or 8', or that the portions 40 be moved inwardly away from the outer portion of the plate 38. The engagement of the portions 40 with the faces 42 prevents this inward movement and since the plate 38 is generally fastened rigidly to the rib 7' by means of screws or the like, outward movement of the plate 38 is prevented so that fracture of the side portions of the insulation piece is rendered much more difficult. Moreover, the side portions 40 are of considerably greater thickness than would be the case were these portions to overlie the jaws 7 and 8 while retaining the same width of plate 38. Consequently, there is a larger body of insulating material on the portions 40 for resisting heat and the burning effect of the arc.

In Fig. 8 I have shown a slightly modified form of construction in which the jaws 47 and 48 correspond to the jaws 7 and 8 shown in Fig. 5. The ribs 47' and 48' correspond to the ribs 7' and 8' shown in Fig. 5. It will be noted that these ribs 47' and 48' are formed dove-tailed in cross-section and are adapted to engage in the dovetailed grooves 49 formed in the insulating plates 50. The portions 51 of the insulation plates engage the outer faces 52 of the jaws 47 and 48. These insulation plates 50 may be driven on the ribs 47' and 48' as a press fit, and thus the use of screws for securing the insulation plates on the ribs 47' and 48' may be dispensed with. This would prevent any possibility of arcing a screw and would permit removal of the same for replacement of the insulation plates. This construction also would permit the insulation plates to be driven off and replaced by the operator on the job. In this way, the operator, being provided with extra insulation plates 50, would always be in a position to easily and quickly remove worn insulation plates so that he could always be assured of an electrode holder having properly insulated parts.

In Fig. 9 I have shown a construction in which the insulating members 18 and 19 are formed integral with the insulation plate 38'.

In Fig. 10 it will be noted that the rib 47' is indicated as slightly wedge-shaped so that when the insulation pieces 50 are driven on the wedge construction will serve to provide a binding press fit.

In Fig. 11 I have shown a pair of jaws 62 and 63 carrying the outwardly projecting spaced apart bosses 64 and 65 onto which the insulation plates 66 may be driven. Each of these plates is provided with a recess 67 to provide a shoulder 68 engageable against which is one end of a leaf spring 69 doubled upon itself and bearing at its outer end against the boss 64. The construction is such that the insulation plate may be driven on and in passing over the outer part of the spring 69, the same will be compressed and serve to snap upwardly behind the shoulder 68, thus resisting removal of the insulation plate.

A similar construction is shown in Fig. 16 in which I have illustrated a pair of jaws 70 and 71, each having a part 72 formed therein in which is positioned a coil spring 73 bearing against a ball 74, which will serve to snap into the recess 75 formed in the insulation plate 76 so as to resist the removal of the insulation plate.

In Fig. 13 I have shown a modified type of electrode holder embodying a handle 78 projecting outwardly from which is a pair of resilient jaws 79 and 80 springable apart by the stirrup 81 carrying the handle 82.

As shown in Fig. 14, each of the jaws 79 and 80 is provided with the outward dove-tailed projection 83 on which the insulation plate 84 may be spread.

Fig. 15 is a longitudinal sectional view of the jaws shown in Fig. 13 and as indicated the bosses or outwardly projecting ribs 83 may be spaced apart longitudinally.

It is thus seen that I have provided outward projections which may fit into recesses or grooves formed in the insulation plates and which will serve as retaining means for these insulation plates.

What I claim as new is:

1. In an electrode holder of the class described, a supporting prong; an electrode engaging jaw on said prong; a pair of spaced apart lugs projecting from said prong; a cooperating clamping jaw; a pivot member supported on said lugs for mounting said cooperative jaw in pivotal relation to said first mentioned jaw; insulating means for insulating the outer faces of said lugs; and securing means for securing said insulating means and said pivot member in operative position relatively to said lugs.

2. In an electrode holder of the class described, a supporting prong; an electrode clamping jaw on said prong; a pair of spaced apart lugs on said prong; a cooperating electrode clamping jaw; a pivot member for pivotally mounting said cooperating jaw on said lugs; insulating means for covering the outer faces of said lugs; and means projecting through said insulating means and threaded into the end of said pivot member for securing said insulating means and said pivot member in operative position on said lugs.

3. In an electrode holder of the class described, a supporting prong; an electrode clamping jaw on the forward end of said prong; a cooperating clamping jaw; a trigger handle extending rearwardly of said cooperating clamping jaw; means for pivotally mounting said trigger handle on said prong for retaining said jaws in cooperative clamping relation moveable relative to each other; a handle mounted on the rear portion of said prong; a spring positioned between and engaging said prong and said trigger handle forwardly of the handle on said prong and rearwardly of the point of pivot; a tubular insulating member embracing the portion of said prong lying forwardly of said spring and rearwardly of the point of pivot and spaced from one side thereof and having ventilating openings formed therein.

4. In an electrode holder of the class described, a pair of pivotally mounted jaws; a trigger-forming handle extending rearwardly from one of said jaws; an insulating tube embracing said trigger handle and terminating at its forward end at substantially the point of pivot, and terminating at its rearward end rearwardly of said trigger handle; and means carried by said trigger handle and projecting through the under side of said tube for securing said tube in position thereon.

5. In an electrode holder of the class described, a supporting prong; an electrode clamping jaw on the forward end of said prong; a cooperating clamping jaw; a trigger handle extending rearwardly of said cooperating clamping jaw; means for pivotally mounting said trigger handle on said prong for retaining said jaws in cooperative clamping relation moveable relative to each other; a handle mounted on the rear portion of said prong; a spring positioned between and engaging said prong and said trigger handle forwardly of the handle on said prong and rearwardly of the point of pivot; a tubular insulating member embracing the portion of said prong lying forwardly of said spring and rearwardly of the point of pivot and spaced from one side thereof.

THOMAS S. DONNELLY, Jr.